United States Patent [19]

Ebi

[11] 4,333,086

[45] Jun. 1, 1982

[54] INK JET PRINTING APPARATUS

[75] Inventor: Yutaka Ebi, Tokyo, Japan

[73] Assignee: Ricoh Company, Ltd., Tokyo, Japan

[21] Appl. No.: 160,770

[22] Filed: Jun. 18, 1980

[30] Foreign Application Priority Data

Jun. 30, 1979 [JP] Japan .................................. 54-82036

[51] Int. Cl.[3] .............................................. G01D 15/18

[52] U.S. Cl. ................................................ 346/140 R

[58] Field of Search .................................. 346/140, 75

[56] References Cited

U.S. PATENT DOCUMENTS

| | | | |
|---|---|---|---|
| 3,060,429 | 10/1962 | Winston | 346/75 |
| 3,553,719 | 1/1971 | Miyazaki | 346/140 |
| 3,750,564 | 8/1973 | Bettin | 346/140 X |
| 3,787,879 | 1/1974 | Ichioka | 346/140 |
| 3,911,448 | 10/1975 | Ohno | 346/140 |
| 4,263,601 | 4/1981 | Nishimura | 346/140 X |

FOREIGN PATENT DOCUMENTS 2031344 4/1980 United Kingdom ................ 346/140

*Primary Examiner*—Joseph W. Hartary

*Attorney, Agent, or Firm*—David G. Alexander

[57] ABSTRACT

Ink is supplied into a discharge passageway (46) which tapers inwardly from the inlet (47) to the outlet (48) thereof with insufficient pressure to cause the ink to be ejected from the passageway (46). Inlet and outlet electrodes (49), (51) are provided at the inlet (47) and outlet (48) of the passageway (46) respectively. Another electrode (52) is provided external of the passageway (46). An electric potential is applied between the inlet and outlet electrodes (49), (51) to polarize the ink in the passageway (46). An opposite electric potential is applied to the external electrode (52) to cause the ink to be electrically attracted and discharged from the passageway (46) onto a sheet of paper (53) for printing. The external electrode (52) may be disposed either in front of or behind the sheet (53).

6 Claims, 8 Drawing Figures

INK JET PRINTING APPARATUS

BACKGROUND OF THE INVENTION

The present invention relates to an ink jet printing apparatus which operates on a novel and heretofore unexploited principle.

Two types of ink jet printing apparatus are well known in the art. In the first type, a steady jet of electrostatically charged ink particles is ejected from a nozzle. Where it is desired to print a dot, an electric deflecting potential is applied to an electrode causing the jet to deflect above a gutter and impinge against a sheet of paper. In the second type, a group of ink particles is ejected from a nozzle in response to an ultrasonic signal applied to a piezoelectric element or bundle of thin wires provided in the nozzle and impinges on a sheet of paper. The first type ejects ink continuously whereas the second type ejects ink on demand.

There is increasing demand in the art for very high resolution printing. Whereas the diameter of dots in conventional ink jet printing is on the order of 100 microns, a dot diameter of 50 microns or less is required for high resolution printing. The diameter of the nozzle orifice must be extremely small and precise, making it very difficult and expensive to machine such nozzles. In addition, such a small diameter orifice tends to become clogged with ink very easily.

Other problems are encountered where a plurality of nozzles are provided in a multi-head arrangement comprising a separate drive control system for each nozzle. The kinetic energy of the ink in the nozzles varies due to differences in the diameters and lengths of the nozzles, pressure pulsations in the ink supplied to the nozzles from a low pressure pump, variations in the electrical parameters of the piezoelectric drive elements, etc. Another problem involves electric fields and air currents between the nozzle and paper which deflect the ink drops from the proper printing positions in a random manner.

SUMMARY OF THE INVENTION

An ink jet printing apparatus embodying the present invention includes an ink ejection passageway and ink supply means for supplying ink into the passageway with insufficient pressure to cause the ink to be discharged from the passageway, and is characterized by comprising first electrode means provided to the passageway, second electrode means provided external of the passageway, and power source means for applying a first electric potential to the first electrode means for electrically polarizing the ink in the passageway and applying a second electric potential to the second electrode means for causing the polarized ink to be ejected from the passageway onto a sheet.

In accordance with the present invention, ink is supplied into a discharge passageway which tapers inwardly from the inlet to the outlet thereof with insufficient pressure to cause the ink to be ejected from the passageway. Inlet and outlet electrodes are provided at the inlet and outlet of the passageway respectively. Another electrode is provided external of the passageway. An electric potential is applied between the inlet and outlet electrodes to polarize the ink in the passageway. An opposite electric potential is applied to the external electrode to cause the ink to be electrically attracted and discharged from the passageway onto a sheet of paper for printing. The external electrode may be disposed either in front of or behind the sheet.

It is an object of the present invention to provide an ink jet printing apparatus which operates in accordance with a novel and unique principle and is superior in operation to ink jet printing apparatus known heretofore.

It is another object of the present invention to improve the quality and resolution of ink jet printing at reduced manufacturing cost.

It is another object of the present invention to provide an ink jet printing apparatus which features high quality printing with a simplified and low cost printing head.

It is another object of the present invention to provide a generally improved ink jet printing apparatus.

Other objects, together with the foregoing, are attained in the embodiments described in the following description and illustrated in the accompanying drawing.

DESCRIPTION OF THE PREFERRED EMBODIMENTS

While the ink jet printing apparatus of the present invention is susceptible of numerous physical embodiments, depending upon the environment and requirements of use, substantial numbers of the herein shown and described embodiments have been made, tested and used, and all have performed in an eminently satisfactory manner.

Figure 1:
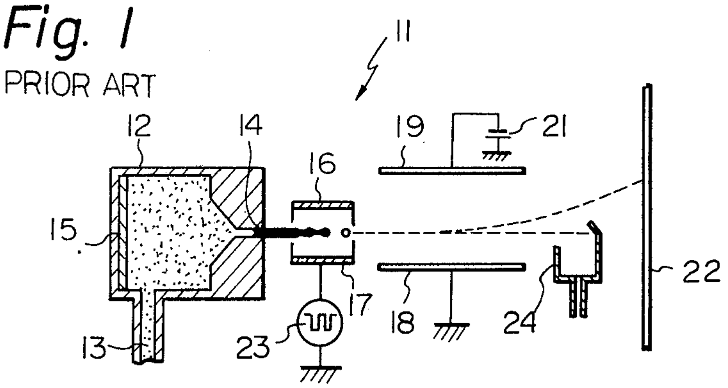
Fig. 1 PRIOR ART
FIG. 1 is a schematic diagram of a prior art ink jet printing apparatus.

Referring now to FIG. 1 of the drawing, a prior art ink jet printing apparatus is generally designated by the reference numeral 11 and comprises an ink ejection head 12. Ink is supplied into the head 12 through an inlet 13. A piezoelectric element 15 vibrates at an ultrasonic frequency and causes the ink to be continuously ejected from an orifice 14 in a stream or jet. The ink jet passes between charging electrodes 16 and 17 and deflecting electrodes 18 and 19. The electrode 18 is grounded whereas the electrode 19 is maintained at a negative potential by a power source 21. Where it is desired to print a dot of ink on a sheet 22, a power source 23 applies a positive pulse to the electrodes 16 and 17 causing the ink jet to be electrostatically charged. The negatively charged electrode 19 causes the jet to be deflected upwardly onto the sheet 22. Where it is not desired to print a dot, the source 23 does not apply a potential to the electrodes 16 and 17 and the ink jet is not charged. Thus, the ink jet is not deflected by the electrode 19 and is caught by a gutter 24.

Figure 2:
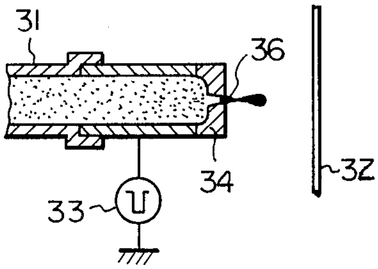
Fig. 2 PRIOR ART
FIG. 2 is a schematic diagram of another prior art ink jet printing apparatus.

Another prior art ink jet printing apparatus is illustrated in FIG. 2 and comprises an ink ejection head 31. Ink is supplied into the head 31. Where it is desired to print a dot on a sheet 32, a power source 33 applies an ultrasonic frequency electric signal to a piezoelectric element 34 which causes a dot of ink to be ejected through an orifice 36 onto the sheet 32. This type of apparatus is known as an ink-on-demand printer since ink ejection is not continuous as in the apparatus 11. Both of the prior art apparatus suffer from poor ink ejection linearity due to lack of homogeneity of the ink and other factors.

Figure 3:
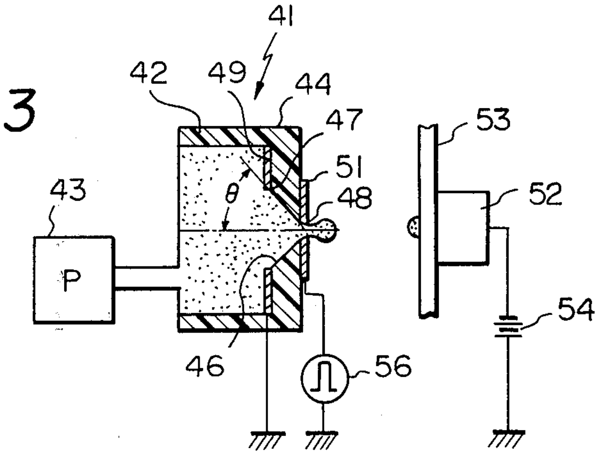
FIG. 3 is a schematic diagram of an ink jet printing apparatus embodying the present invention.

These problems are overcome in an ink jet printing apparatus embodying the present invention which is illustrated in FIG. 3. The present apparatus is designated as 41 and comprises an ink ejection head 42. Ink is supplied to the head 42 by a pump 43 with insufficient pressure to cause the ink to be ejected from the head 42.

The head 42 comprises a plate 44 made of an electrically insulating material which is formed with a discharge passageway 46. It will be noted that the passageway 46 tapers inwardly from an inlet 47 to an outlet 48 thereof.

A grounded inlet electrode 49 is disposed on the left wall of the plate 44 at the inlet 47. An outlet electrode 51 is deposited on the right wall of the plate 44 at the outlet 48. An external or back electrode 52 is disposed between the passageway 46 and a sheet of paper 53. A power source 54 applies a negative electric potential to the electrode 52.

A power source 56 is capable of applying positive electric pulses to the electrode 51 to print dots on the sheet 53. However, in the absence of the positive potential on the electrode 51, no ink will be discharged from the passageway 46.

Figure 4:
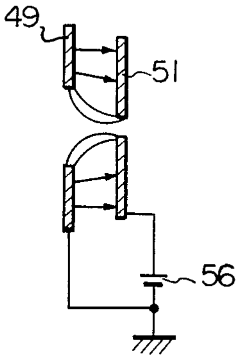
FIG. 4 is a diagram illustrating an electric field in the present apparatus.
Figure 5:
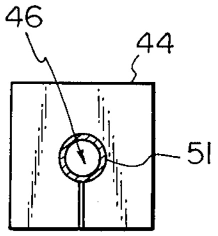
FIG. 5 is a front elevation of the present apparatus.

Referring also to FIGS. 4 and 5, it will be seen that with the positive potential applied to the electrode 51, an electric field is produced between the electrodes 49 and 51. This causes the ink in the passageway 46 to be positively polarized. The negative potential on the electrode 52 attracts the positively polarized ink and causes the same to be ejected from the passageway 46 toward the electrode 52 and hit the paper 53 to print a dot. Ink will be ejected for the duration of the positive pulse applied to the electrode 51.

The force F causing the ink to move from the passageway 46 toward the electrode 52 is as follows $$F=\alpha\cdot \text{grad}\,(E)^2+qE$$

where $\alpha$ is a polarization constant of the ink, q is the electric charge on the ink and E is the electric field intensity. The force resulting from the polarization of the ink is represented by the first term of the equation whereas the force resulting from Coulomb attraction is represented by the second term. In a typical application, polarization of the ink will result from applying about +500 V to the electrode 51. Ejection of ink from the passageway 46 will result from Coulomb attraction where about −1000 V is applied to the electrode 52. In order to increase the polarization, it is desirable to increase the electric field intensity factor $E^2$. This is accomplished by tapering the passageway 46 inwardly by a large angle $\theta$ as illustrated.

The apparatus 41 will not operate using ink with low electrical resistivity since electric conduction would prevent polarization of the ink. Commercially available ink having a resistivity in excess of $10^8$ ohm-centimeters and low surface tension is generally satisfactory although somewhat greater resistivity may be required depending on the frequency of the pulses from the source 56.

The present apparatus 41 enables highly linear and stable printing without precision machining of the passageway 46 and it is not even required that the passageway 46 be at an exact right angle to the sheet 53. The diameter of the outlet 48 can be quite large compared to the prior art and still attain small ink particle diameter and high density printing. The direction of ink ejection is always exact since the ink is attracted directly toward the electrode 52.

Figure 6:
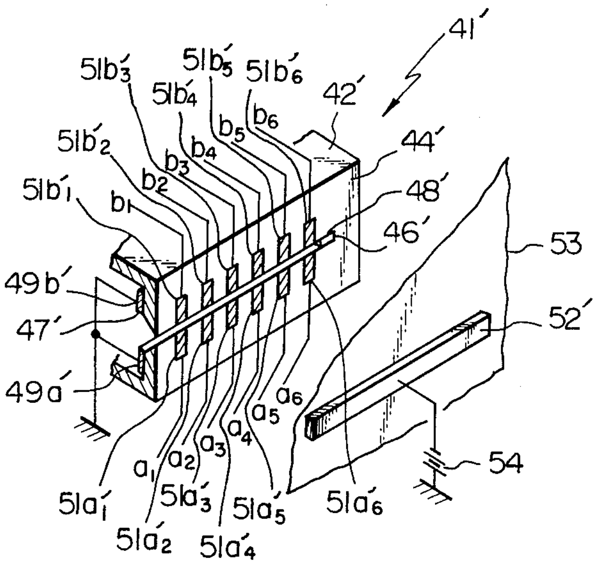
FIG. 6 is a perspective view of another ink jet printing apparatus embodying the present invention.

FIG. 6 illustrates another apparatus embodying the present invention which is designated as 41'. Like elements are designated by the same reference numerals used in FIG. 3 whereas corresponding but modified elements are designated by the same reference numerals primed.

In this case, the passageway 46' and electrode 52' are elongated and mutually conjugate. The inlet electrode 51 is replaced with elongated inlet electrodes **49*a*' and 49*b*' disposed below and above the passageway 46' respectively and grounded. The single electrode 51 is replaced by a plurality of electrodes 51*a*1' to 51*a*6' disposed below the passageway 46' and a plurality of electrodes 51*b*1' to 51*b*1' disposed above the passageway 46'. Positive pulses a1 to a6 and b1 to b6 may be applied to the electrodes 51*a*1' to 51*a*6' and 51*b*1' to 51*b*6' in pairs for individual printing. For example, if it is desired to print a dot using the electrodes 51*a*3' and 51*b*3'**, positive pulses would be applied thereto together.

It will be understood that the arrangement of FIG. 6 constitutes a multi-jet printing apparatus which enables selective printing at six different points on a line. The voltage applied to the electrodes **49*a*' and 49*b*' as well as to the electrodes 51*a*1' to 51*a*6' and 51*b*1' to 51*b*6'** may be either D.C. or A.C. The pulse duration or amplitude may be varied to provide variable ink dot density and continuous tone printing.

Figure 7:
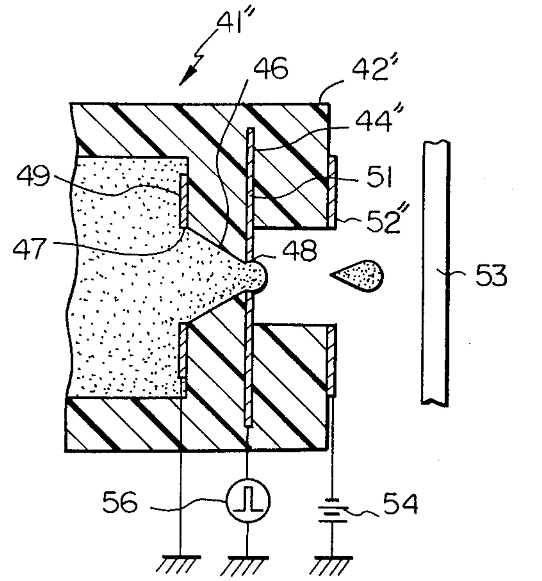
FIG. 7 is a schematic view of another ink jet printing apparatus embodying the present invention.
Figure 8:
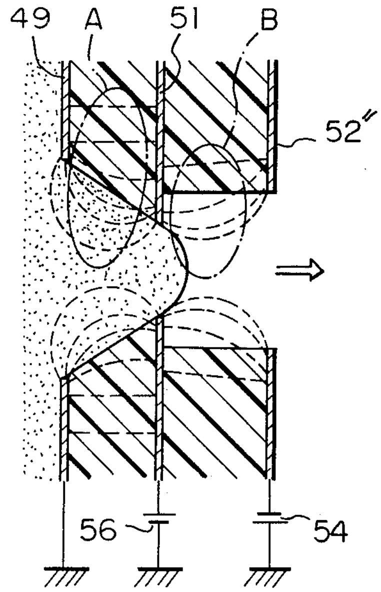
FIG. 8 is a diagram illustrating electric fields in the apparatus of FIG. 7.

FIGS. 7 and 8 illustrate another apparatus 41" embodying the present invention in which modified but corresponding elements are designated by the same reference numerals double primed. It will be noted that in the apparatus 41", the electrode 52" is disposed between the passageway 46 and sheet 53 and functions as an accelerating electrode. The polarized ink is attracted by the electrode 52" and passes therethrough to the paper 53.

Both the polarization and Coulomb forces act on the ink when the pulse from the generator 56 is not produced. Due to the high resistivity of the ink, the polarization force acts initially but the Coulomb force predominates after a lapse of time causing a convex meniscus to form at the outlet 48. The positive pulse applied to the electrode 51 causes the polarization force to act in an area A of FIG. 8 so that a dot of ink is ejected toward the paper 53. The dot or drop of ink is accelerated in an area B by the electrode 52" and passes therethrough to hit the paper 53. It will be noted that the polarities applied to the electrodes 51 and 52" may be reversed at the time of ejection to yet further promote ejection.

In summary, it will be seen that the present invention overcomes the drawbacks of the prior art and provides an ink jet printing apparatus capable of improved high resolution printing using a simplified and inexpensive arrangement. Various modifications will become possible for those skilled in the art after receiving the teachings of the present disclosure without departing from the scope thereof.

What is claimed is:

1. An ink jet printing apparatus including an ink ejection passageway and ink supply means for supplying ink into the passageway with insufficient pressure to cause the ink to be discharged from the passageway, characterized by comprising:

first electrode means provided to the passageway;

second electrode means provided external of the passageway;

and power source means for applying a first electric potential to the first electrode means for electrically polarizing the ink in the passageway and applying a second electric potential to the second electrode means for causing the polarized ink to be ejected from the passageway onto a sheet;

the first electrode means comprising an inlet electrode provided at an inlet of the passageway and an outlet electrode provided at an outlet of the passageway, the power source means applying the first electric potential to the outlet electrode and applying a potential to the inlet electrode such that the first and second electric potentials are opposite in polarity relative to the potential applied to the inlet electrode.

2. An apparatus as in claim 1, in which the passageway tapers inwardly from the inlet the outlet thereof.

3. An apparatus as in claim 1, in which the second electrode means is disposed between the passageway and the sheet.

4. An apparatus as in claim 1, in which the sheet is disposed between the passageway and the second electrode means.

5. An apparatus as in claim 1, in which the passageway is defined by an electrically insulating member.

6. An apparatus as in claim 1, in which the passageway is elongated, the apparatus further comprising a second outlet electrode spaced from said outlet electrode at the outlet of the passageway, the inlet electrode and second electrode being elongated so as to face both said outlet electrode and the second outlet electrode, the power source being constructed to individually apply the first electrical potential to said outlet electrode and the second outlet electrode.

* * * * *